US012709363B1

(12) United States Patent
Ward et al.

(10) Patent No.: US 12,709,363 B1
(45) Date of Patent: Aug. 18, 2026

(54) SYSTEMS AND METHODS FOR CONTROLLING ROLL ON A MARINE VESSEL WITH A GYROSCOPIC STABILIZER SYSTEM

(71) Applicant: Brunswick Corporation, Mettawa, IL (US)

(72) Inventors: Aaron J. Ward, Oshkosh, WI (US); Matthew W. Snyder, Fond du Lac, WI (US); Ryan M. Trost, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 73 days.

(21) Appl. No.: 18/645,721

(22) Filed: Apr. 25, 2024

(51) Int. Cl.
*B63B 39/04* (2006.01)
*G05D 1/495* (2024.01)
*G05D 109/30* (2024.01)

(52) U.S. Cl.
CPC ............ *B63B 39/04* (2013.01); *G05D 1/495* (2024.01); *G05D 2109/34* (2024.01)

(58) Field of Classification Search
CPC ..... B63B 39/04; G05D 1/495; G05D 2109/34
See application file for complete search history.

(56) References Cited

U.S. PATENT DOCUMENTS 4,918,628 A 4/1990 Griffin
5,787,832 A 8/1998 Spinka
6,973,847 B2 12/2005 Adams
7,305,928 B2 12/2007 Bradley
8,417,399 B2 4/2013 Arbuckle
8,478,464 B2 7/2013 Arbuckle
8,899,166 B2 12/2014 Steinmann
8,904,948 B2 12/2014 Steinmann
8,924,054 B1 12/2014 Arbuckle
9,248,898 B1 2/2016 Kirchhoff
9,278,740 B1 3/2016 Andrasko
9,422,034 B2 8/2016 Bauer
9,745,036 B2 8/2017 Andrasko
10,437,248 B1 10/2019 Ross
10,671,073 B2 6/2020 Arbuckle
10,926,855 B2 2/2021 Derginer
11,372,411 B1 6/2022 Derginer
11,493,391 B2 11/2022 Sanger
11,675,372 B2 6/2023 Derginer
2005/0274210 A1 12/2005 Adams (Continued)

OTHER PUBLICATIONS

Seakeeper, When Not to Use Your Seakeeper, Found online via https://www.seakeeper.com/faqs/when-not-to-use-your-seakeeper/. Last accessed Dec. 21, 2023.

(Continued)

*Primary Examiner* — Michael J Zanelli
(74) *Attorney, Agent, or Firm* — Andrus Intellectual Property Law, LLP

(57) ABSTRACT

A system for stabilizing a marine vessel is provided. The system includes a gyroscopic stabilizer system configured to generate a stabilization torque and one or more controllers. The one or more controllers are configured to determine that a turn parameter of the marine vessel exceeds a turn threshold and that a speed parameter of the marine vessel exceeds a speed threshold, and operate the gyroscopic stabilizer system to achieve a target bank angle for the marine vessel.

19 Claims, 6 Drawing Sheets

(56) References Cited

U.S. PATENT DOCUMENTS

| | | | | |
|---|---|---|---|---|
| 2007/0089654 | A1 | 4/2007 | Bradley | |
| 2008/0167768 | A1 * | 7/2008 | Rubenstein | B63B 39/04<br>701/21 |
| 2011/0172858 | A1 | 7/2011 | Gustin | |
| 2016/0039500 | A1 | 2/2016 | Heyring | |
| 2020/0140051 | A1 | 5/2020 | Derginer | |
| 2020/0140052 | A1 | 5/2020 | Derginer | |
| 2020/0249678 | A1 | 8/2020 | Arbuckle | |
| 2023/0021635 | A1 | 1/2023 | Gallagher | |
| 2023/0030018 | A1 | 2/2023 | Ross | |
| 2023/0033185 | A1 | 2/2023 | Ross | |
| 2023/0097909 | A1 | 3/2023 | Miocevich | |
| 2024/0326959 | A1 * | 10/2024 | Armstrong | B63B 79/40 |

OTHER PUBLICATIONS

Poh et al. Gyroscopic Stabilization of Rolling Motion in Simplified Marine Hull Model, 2017, IEEE, p. 1-6 (Year: 2017).

Kurowski et al., Multi-Vehicle Guidance, Navigation and Control Towards Autonomous Ship Maneuvering in Confined Waters, 2019, IEEE, p. 2559—(Year: 2019).

Townsend et al., Control Strategies for Marine Gyrostabilizers, 2013, IEEE, p. 243-255 (Year: 2013).

Townsend et al., A Gyroscopic Wave Energy Recovery System for Marine Vessels, 2012, IEEE, p. 271-280 (Year: 2012).

* cited by examiner

SYSTEMS AND METHODS FOR CONTROLLING ROLL ON A MARINE VESSEL WITH A GYROSCOPIC STABILIZER SYSTEM

FIELD

The present disclosure relates to gyroscopic stabilization systems for marine vessels, and more specifically, to systems and methods for controlling roll of the marine vessel using the gyroscopic stabilization system responsive to certain conditions.

BACKGROUND

U.S. Pat. No. 9,278,740 is directed to a system for controlling an attitude of a marine vessel having first and second trim tabs includes a controller having vessel roll and pitch control sections. The pitch control section compares an actual vessel pitch angle to a predetermined desired vessel pitch angle and outputs a deployment setpoint that is calculated to achieve the desired pitch angle. The roll control section compares an actual vessel roll angle to a predetermined desired vessel roll angle, and outputs a desired differential between the first and second deployments that is calculated to maintain the vessel at the desired vessel roll angle. When the controller determines that the magnitude of a requested vessel turn is greater than a first predetermined threshold, the controller decreases the desired differential between the first and second deployments, and accounts for the decreased desired differential deployment in its calculation of the first and second deployments.

U.S. Pat. No. 9,745,036 is directed to a trim control system that automatically controls trim angle of a marine propulsion device with respect to a vessel. A memory stores trim base profiles, each defining a unique relationship between vessel speed and trim angle. An input device allows selection of a base profile to specify an aggressiveness of trim angle versus vessel speed, and then optionally to further refine the aggressiveness. A controller then determines a setpoint trim angle based on a measured vessel speed. If the user has not chosen to refine the aggressiveness, the controller determines the setpoint trim angle from the selected base profile. However, if the user has chosen to refine the aggressiveness, the controller determines the setpoint trim angle from a trim sub-profile, which defines a variant of the relationship between vessel speed and trim angle defined by the selected base profile. The control system positions the propulsion device at the setpoint trim angle.

U.S. Pat. No. 11,372,411 is directed to a steering system on a marine vessel includes at least one propulsion device, a steering actuator that rotates the propulsion device to effectuate steering, at least one trim device moveable to adjust a running angle of the vessel, and a trim actuator configured to move the trim device so as to adjust the running angle. The system further includes a control system configured to determine a desired roll angle and at least one of a desired turn rate and a desired turn angle for the marine vessel based on a steering instructions. The control system then controls the steering actuator to rotate the at least one propulsion device based on the desired turn rate and/or the desired turn angle, and to control the trim actuator to move the at least one trim device based on the desired roll angle so as to effectuate the steering instruction.

U.S. Patent Publication No. 2023/0030018 is directed to a system for orienting a marine vessel. The system includes marine propulsion devices, a gyroscopic stabilizer system, and a manually operable control device configured to provide an output signal which is representative of a desired movement of the marine vessel. The system further includes a controller operably coupled to the marine propulsion devices, the gyroscopic stabilization system and the manually operable control device. The controller is configured to receive the output signal from the manually operable control device, resolve said desired movement of the marine vessel into a target movement command, operate the marine propulsion devices to exert a thrust on the marine vessel to achieve the target movement command, and operate the gyroscopic stabilizer system consistent with the thrust exerted by the plurality of marine propulsion devices to achieve the target movement command.

U.S. Patent Publication No. 2023/0033185 is directed to a system for orienting a marine vessel. The system includes marine propulsion devices, a gyroscopic stabilizer system, and a controller operably coupled to the marine propulsion devices and the gyroscopic stabilization system. The controller is configured to control operation of the marine propulsion devices to minimize a control torque output of the gyroscopic stabilizer system while maintaining the marine vessel in a selected global position and/or heading.

The above patents and patent publications are hereby incorporated by reference in their entireties.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

According to one implementation of the present disclosure, a system for stabilizing a marine vessel is provided. The system includes a gyroscopic stabilizer system configured to generate a stabilization torque and one or more controllers. The one or more controllers are configured to determine that a turn parameter of the marine vessel exceeds a turn threshold and that a speed parameter of the marine vessel exceeds a speed threshold, and operate the gyroscopic stabilizer system to achieve a target bank angle for the marine vessel.

According to another implementation of the present disclosure, method for controlling a gyroscopic stabilizer system configured to generate a stabilization torque for a marine vessel is provided. The method includes determining that a turn parameter of the marine vessel exceeds a turn threshold and that a speed parameter of the marine vessel exceeds a speed threshold, and operating the gyroscopic stabilizer system to achieve a target bank angle for the marine vessel.

BRIEF DESCRIPTION OF THE DRAWINGS

The present disclosure is described with reference to the following Figures. The same numbers are used throughout the Figures to reference like features and like components.

DETAILED DESCRIPTION

Figure 1:
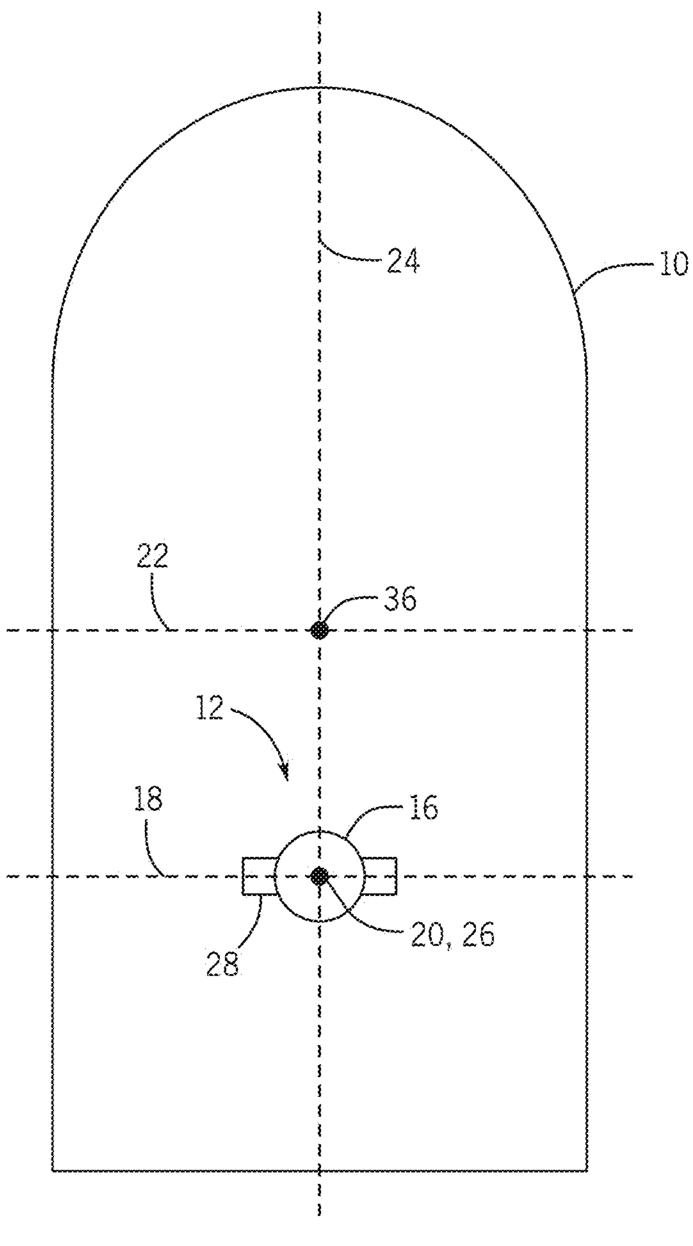
FIG. 1 is a schematic top view representation of a marine vessel having marine a gyroscopic stabilizer system.

Gyroscopic stabilizer systems are used on marine vessels to suppress unwanted disruptions to the marine vessel due to the force of waves, wakes, or wind acting upon the marine vessel. Using the stored angular momentum of a spinning flywheel that is free to process about one or more axes, gyroscopic stabilizer systems are configured to produce stabilization torques that dampen unwanted movements of the marine vessel (e.g., roll movements) in order to provide the occupants with a more comfortable experience. However, during a turning operation of the marine vessel, it is desirable for the marine vessel to be permitted to roll to some extent so that the resultant forces on the occupants are exerted normally to the floor and/or seating of the vessel and the occupants are driven down into their seats. Such a result is more comfortable to the occupants than the effect if a marine vessel is not permitted to roll during a turning operation. When the vessel is not permitted to roll, the resultant forces on the occupants are exerted parallel to the floor and/or seating of the vessel, causing the occupants to be forced laterally towards the sides of the vessel during a turn. Accordingly, in order to prevent the gyroscopic stabilizer system from generating stabilization torques that would otherwise counteract desired roll of the vessel, existing systems generally instruct operators of the vessel to perform a manual locking procedure to limit or arrest precession of the flywheel before completing a turn operation.

The present inventors have therefore recognized that systems and methods for automatically operating a gyroscopic stabilizer system on a marine vessel to aid in achieving an optimal roll or bank angle during a turning operation would be useful. Therefore, as soon as the control system for the gyroscopic stabilizer system determines that the vessel is completing a turn while operating above a threshold speed, the control system stops the gyroscopic stabilizer from generating a stabilization torque that would oppose the roll of the vessel. Simultaneously, the control system calculates an optimal roll or bank angle for the vessel based on the speed of the vessel and the rate of turn. If the control system detects that the vessel has exceeded the optimal angle while completing turn operation, it can automatically command re-enablement of the gyroscopic stabilizer system to aid in maintaining the optimal roll or bank angle.

FIGS. 1-4 depict an exemplary marine vessel 10 having a gyroscopic stabilizer system 12. The gyroscopic stabilizer system 12 suppresses unwanted roll motions about a roll axis 24 of the marine vessel 10 by producing stabilizing torques through controlled precession of stored angular momentum of a spinning flywheel contained within a flywheel enclosure 16. In an exemplary embodiment, the flywheel enclosure 16 is mounted in a gyroscopic support structure 28 that includes a one degree of freedom gimbal system such that a spin axis 26 of the flywheel within the enclosure 16 is permitted to rotate about a gimbal axis 18. In various embodiments, the flywheel is mounted on a shaft that permits the flywheel to spin about its spin axis 26, and the shaft is supported by bearings within the gyroscopic support structure 28 that permit the shaft to rotate such that the spin axis 26 precesses about a gimbal axis 18 that is parallel to a pitch axis 22 of the marine vessel 10.

The gimbal axis 18 is perpendicular to spin axis 26. Spin axis 26 tilts relative to the vertical axis 20 of the marine vessel 10 while staying within a vertical plane 30 (see FIGS. 3 and 4). The roll axis 24 of the marine vessel 10 is perpendicular to the gimbal axis 18 and the pitch axis 22 and lies within the plane 30. A vertical axis 20 of the gyroscopic stabilizer system 12 passes through and is perpendicular to the gimbal axis 18 and perpendicular to the roll axis 24 of the marine vessel 10. Vertical axis 20 is also shown to be parallel to yaw axis 36 of the marine vessel 10. The orientations of the gimbal axis 18, the vertical plane 30, the roll axis 24, and the vertical axis 20 do not change relative to the marine vessel 10 as the marine vessel 10 moves through the water.

The amount of rotation of the spin axis 26 about the gimbal axis 18 measured from the vertical axis 20 is the precession angle θ. In this way, the gyroscopic stabilizer system 12 is utilized to stabilize roll motions of the marine vessel 10 about the roll axis 24 by generating stabilizing torques about the roll axis 24. The direction of the stabilizing torque 32 (see FIG. 4) opposes the direction of the induced roll torque 34, thereby dampening the resulting roll motion induced by the roll torque and providing the occupants of the marine vessel 10 with a more comfortable experience. The magnitude of the stabilizing torque 32 is proportional to the rate of rotation of the flywheel within the enclosure 16, the moment of inertia of the flywheel, and the rate of precession about the gimbal axis 18.

Other orientations of the gyroscopic stabilizer system 12 are possible to induce an identical roll-opposing stabilizing torque. For example, the gyroscopic stabilizer system 12 may instead be oriented such that the flywheel within the flywheel enclosure 16 rotates about the latitudinal axis of the vessel 10 (i.e., the gimbal axis 18) when its precession angle is zero. In such an embodiment, the spin axis precesses about the vertical axis 20 to generate a stabilizing torque about the roll axis 24 to dampen the roll motion of the vessel 10. In still further implementations, the structure of the gyroscopic stabilizer system 12 and the gyroscopic support structure 28 may permit accommodation of any desired orientation of the spin and gimbal axes, such that the resulting stabilizing torque is configured to counteract a roll torque.

Figure 2:
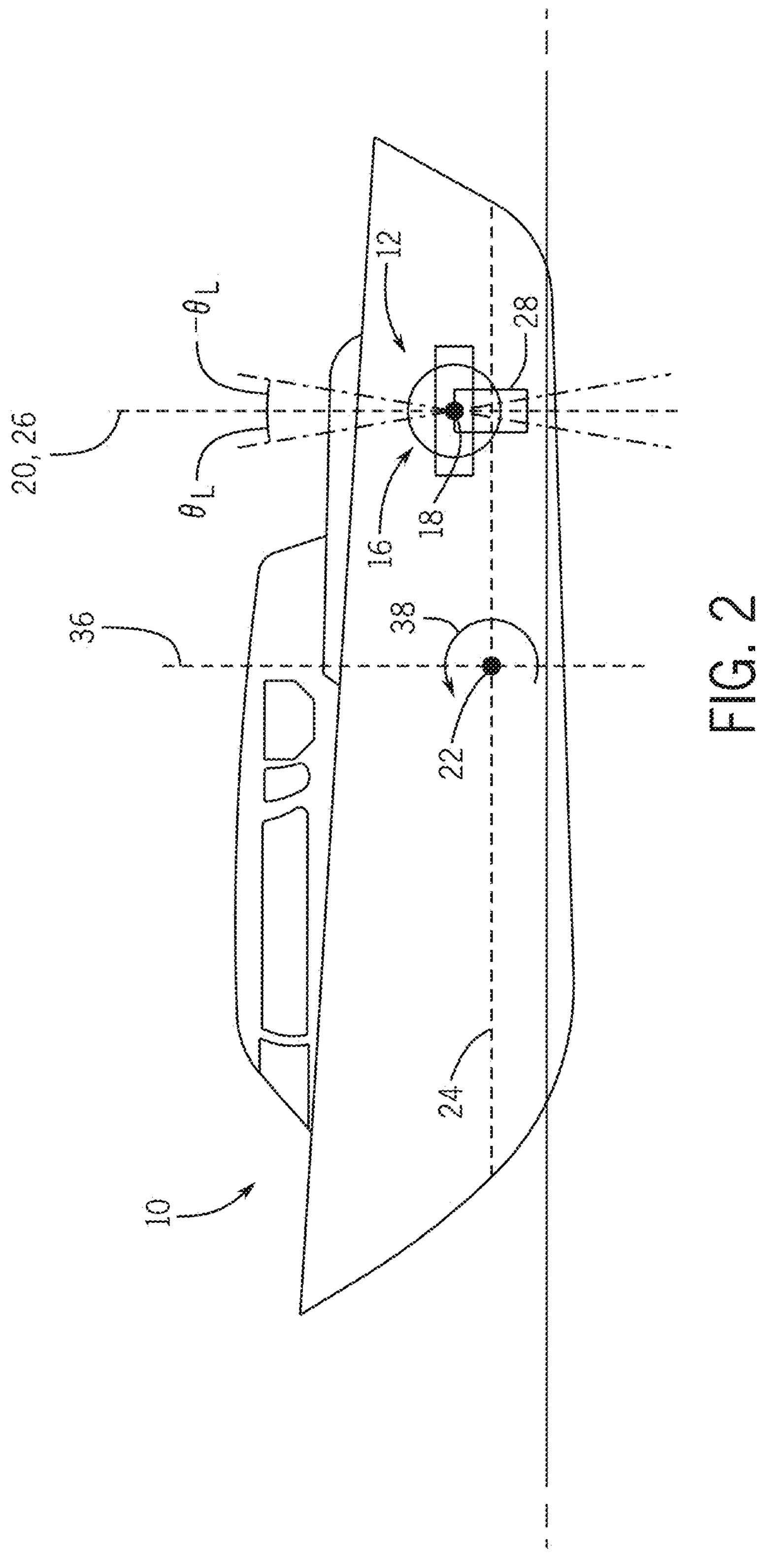
FIGS. 2 and 3 are schematic side view representation of the marine vessel of FIG. 1.
Figure 3:
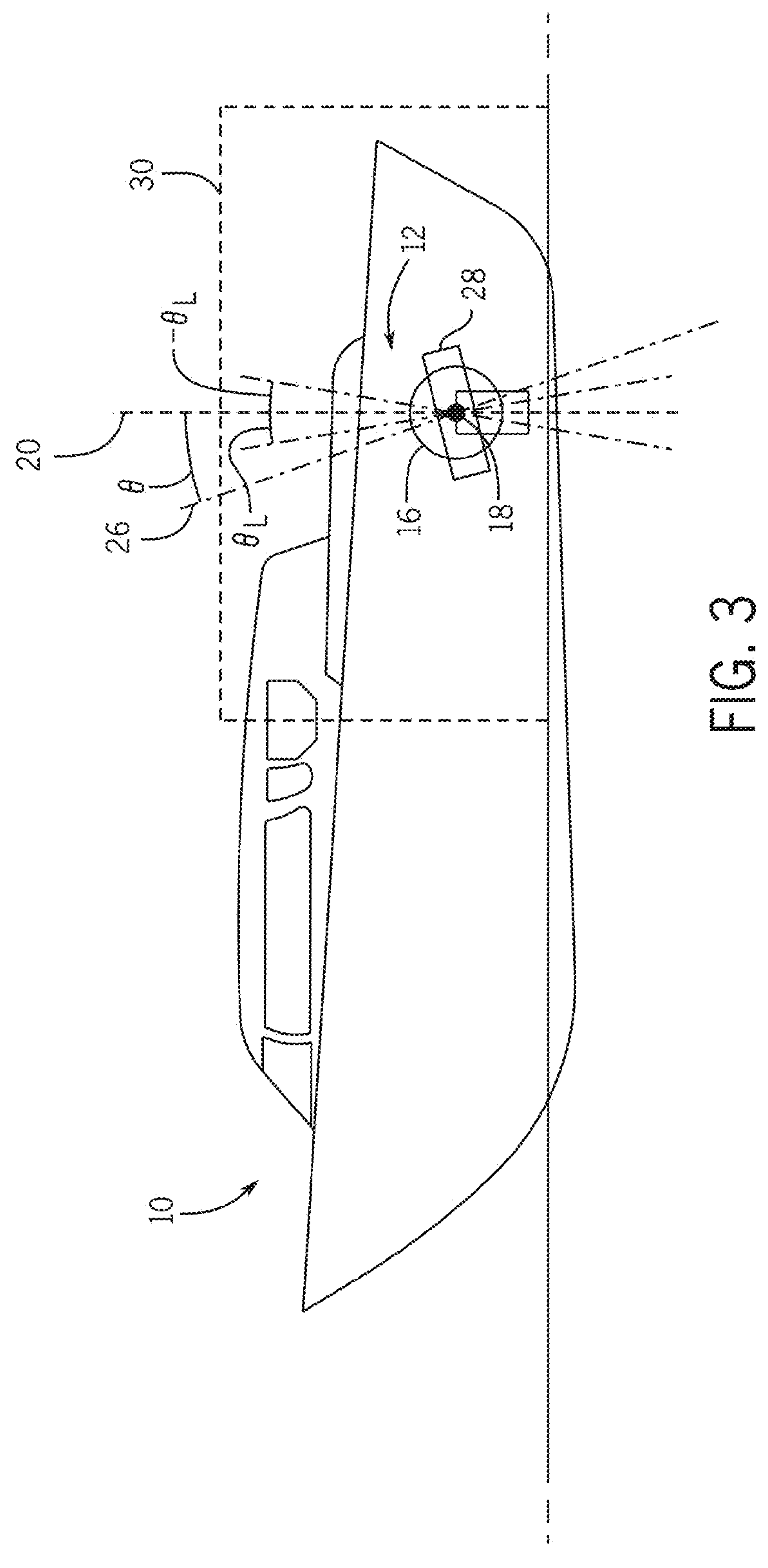
Figure 4:
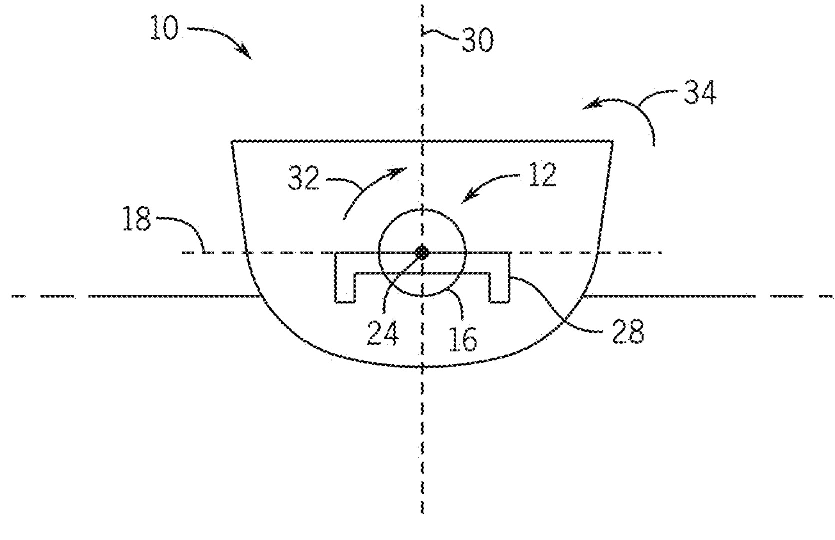
FIG. 4 is a schematic rear view representation of the marine vessel of FIG. 1.

Referring specifically to FIGS. 2 and 3, a predetermined lockout range indicated by angle $\pm\theta_L$ for the gyroscopic stabilization system 12 is shown. The predetermined lockout range $\pm_L$ is representative of a maximum amount of precession that the spin axis 26 can process without generating a significant stabilization torque. In an exemplary implementation, the predetermined lockout range $\pm\theta_L$ may be 10 degrees from the vertical axis 20 in both the fore and aft directions. However, in other implementations, the predetermined lockout range $\pm\theta_L$ may be larger or smaller than 10 degrees and may depend on a variety of factors including the moment of inertia of the flywheel and its spin rate and the size of the marine vessel 10.

The precession angle θ of the stabilizer system 12 can be locked within the predetermined lockout range $\pm\theta_L$ via application of a braking force at some moment arm to the precession gimbal axis 18 to create a braking torque on the gyroscope enclosure 16. The braking torque may be applied via a braking system of the gyroscopic support structure 28. In various embodiments, the braking system could include any suitable type of brake or braking system, including electromagnetic brakes, hydraulic brakes, or mechanical brakes (e.g., drum brakes, disc brakes).

Figure 5:
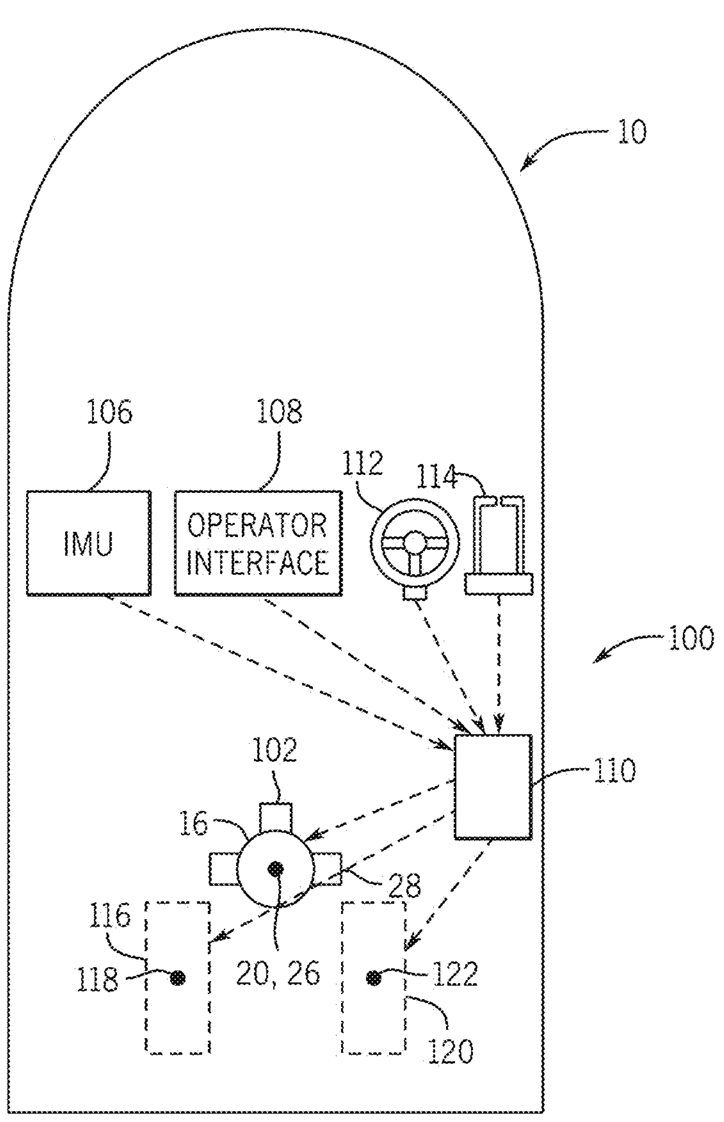
FIG. 5 illustrates a block diagram of a control system for controlling a gyroscopic stabilizer system for a marine vessel.

FIG. 5 depicts a block diagram of the control system 100 of the marine vessel 10 that may be utilized to automatically control the gyroscopic stabilizer system 12 to lock its precession angle θ within the predetermined lockout range $\pm\theta_L$ to limit the stabilization torques that can be generated as a result of the gyroscopic stabilizer system 12. The control system 100 is further configured to subsequently unlock the precession angle θ when the control system 100 determines that use of the gyroscopic stabilizer system 12 to generate a stabilizing torque is desirable to achieve and maintain an optimal bank angle. The control system 100 is shown to include a main controller 110 that is in communication with the gyroscopic stabilizer system 12 and an inertial measurement unit (IMU) 106. Various exemplary embodiments of the IMU 106 may include a differential correction receiver, accelerometers, angular rate sensors, and a microprocessor which manipulates the information obtained from these devices to provide the velocity and acceleration of the marine vessel 10 in six or less degrees of freedom. The main controller 110 also receives data from a precession angle sensor 102 that is configured to sense the precession angle θ of the stabilizer system 12. The precession angle sensor could utilize any suitable sensing technology (e.g., capacitance, eddy current, photelectric, ultrasonic, induction, Hall Effect, magnetoresistance, variable reluctance).

The main controller 110 is further shown to be in communication with an operator interface device 108 (e.g., a display device). The operator interface 108 may be configured to permit the operator to enable or disable an autopilot system for the marine vessel 10, for example, by pressing a button on the display device. The marine vessel 10 also includes a steering wheel 112 and a throttle/shift lever 114. These devices function in the conventional manner, such that rotation of the steering wheel 112 for example activates a transducer that provides a signal to the main controller 110 regarding a desired direction of the marine vessel 10. The main controller 110 then send signals to marine drives 116, 120. The marine drives 116, 120 are configured to provide propulsive forces to the marine vessel 10 and include steering actuators so that the drives can pivot around steering axes 118, 122 and achieve desired orientations of the marine drives 116, 120. The throttle/shift lever 114 sends signals to the main controller 110 regarding the desired gear (forward, reverse, or neutral) and the desired rotational speed of engines or motors associated with the marine drives 116, 120. Each of the marine drives 116, 120 may be any internal combustion or electric motor powered device that propels the vessel 10, such as an inboard drive, inboard/outboard drive, stem drive, jet drive or the like. In addition, although FIG. 5 depicts the marine vessel 10 as including two drives 116, 120, marine vessel 10 may include any number of drives, including a single drive.

Figure 6:
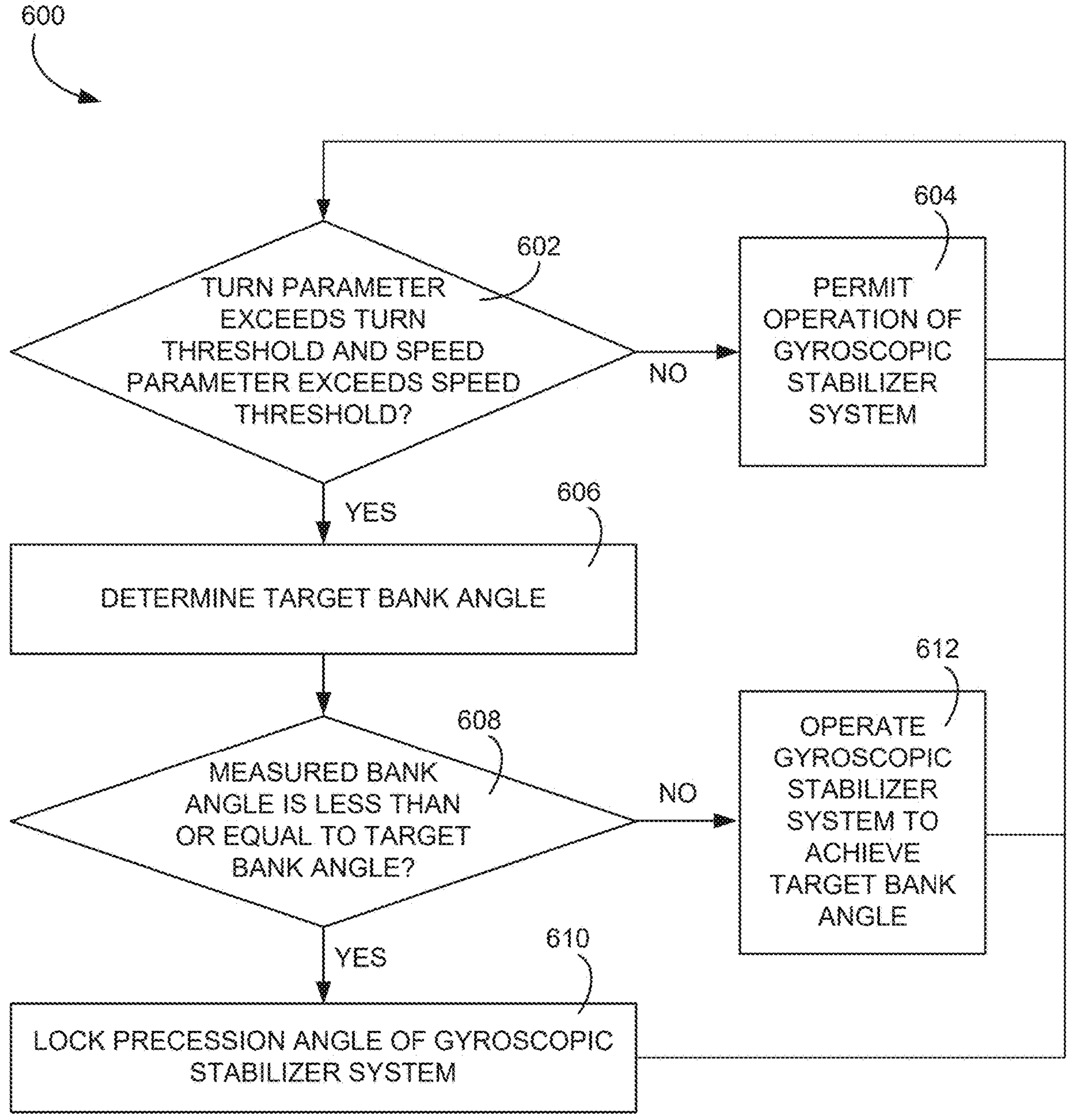
FIG. 6 illustrates an exemplary method for controlling a gyroscopic stabilizer system to achieve optimal roll of the marine vessel.

Turning now to FIG. 6, a method 600 for controlling a gyroscopic stabilizer system to achieve optimal roll of the marine vessel 10 is shown. In an exemplary implementation, method 600 is performed primarily by the main controller 110 of the control system 100 depicted in FIG. 5. Method 600 commences at step 602, as the main controller 110 detects that both: 1) a turn parameter of the marine vessel 10 exceeds a turn threshold value and 2) a speed parameter of the marine vessel 10 exceeds a speed threshold value. In various embodiments, the turn parameter could be a turn rate or change in heading of the vessel as commanded by a manually operable steering device (e.g., steering wheel 112) or an autopilot, or measured by the IMU 106. The speed parameter could be a vessel speed over ground or vessel speed over water parameter as determined by the IMU 106, an engine or motor speed (RPM) of the marine drives 116, 120, or a throttle position (i.e., throttle %) of the throttle lever 114. If one or both of the turn and speed parameters do not exceed the turn and speed thresholds, method 600 proceeds to step 604, and the main controller 110 continues to permit the gyroscopic stabilizer system 12 to freely process and generate stabilizing torques 32 to counteract rotations about the roll axis 24 of the marine vessel 10.

However, if the main controller 110 determines that both the turn and speed parameters exceed the respective turn and speed thresholds at step 602, method 600 proceeds to step 606, and the main controller 110 calculates a target bank angle for the marine vessel 10 while completing the turn operation. In an exemplary implementation, the target bank angle φ can be calculated via the equation below and is representative of the angle of the vessel 10 during the turn in which the majority of the resultant force on the occupants is exerted normal to the floor of the vessel, where g is the force of gravity:

$$\varphi = \tan^{-1}\frac{\pi * \text{vessel speed} * \text{turn rate}}{180 * g}$$

For the equation above, φ is calculated in degrees (deg), with the vessel speed provided in units of meters/second (m/s), the turn rate provided in units of deg/s, and g provided in units of $m/s^2$.

Once the target bank angle φ is determined at step 606, method 600 proceeds to step 608, and the main controller 110 determines whether the measured bank angle of the vessel 10 as determined by the IMU 106 is less than or equal to the target bank angle φ. If the measured bank angle is less than or equal to the target bank angle φ, the main controller 110 acts to lock the precession angle θ of the gyroscopic stabilizer system 12 to reduce or eliminate any stabilization torques 32 counteracting roll of the vessel 10. In an exemplary implementation, the main controller 110 may further determine the present precession angle θ of the gyroscopic stabilizer system 12, and if the precession angle θ is not within the predetermined lockout range $\pm\theta_L$, the main controller 110 will execute a precession return procedure to return the precession angle θ within the predetermined lockout range $\pm\theta_L$. An exemplary precession return procedure is described in U.S. application Ser. No. 18/600,104, filed Mar. 8, 2024, incorporated by reference herein in its entirety.

However, if the main controller 110 determines that the measured bank angle of the marine vessel 10 is not less than or equal to the target bank angle φ determined at step 606 (i.e., the measured bank angle is greater than the target bank angle φ, for example, due to wake or wind acting upon the vessel 10 to increase the roll beyond its optimal position), method 600 proceeds to step 612 and the main controller 110 operates the gyroscopic stabilizer system 12 to permit free precession and generate a stabilizing torque 32 that counteracts the roll of the vessel 10. Method 600 may be performed continuously while the marine vessel 10 is completing a turn operation. For example, at the beginning of a turn operation, the main controller 110 may first determine that the measured bank angle is less than the target bank angle φ at step 608, and therefore the precession angle θ of the gyroscopic stabilizer system 12 should be locked to prevent the stabilizer system 12 from counteracting the desired role. However, later in the turn operation and upon subsequent iterations of the method 600, the main controller 110 may determine that the measured bank angle exceeds the target bank angle φ at step 608, and the precession angle θ of the gyroscopic stabilizer system 12 should be unlocked to ensure that the roll or bank angle of the vessel 10 does not become too great. In an exemplary implementation, method 600 is performed continuously until the main controller 110 determines that the turn has been completed and the heading of the marine vessel 10 has reached a steady state. In various implementations, the main controller may utilize the turn parameter (e.g., a measured or calculated turn rate, input from the steering wheel 112 or autopilot) or a measured bank angle of the marine vessel 10 to determine that the turn has been completed.

This written description uses examples to disclose the invention, including the best mode, and to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A system for stabilizing a marine vessel, comprising:
- a gyroscopic stabilizer system configured to generate a stabilization torque;
- one or more controllers configured to:
  - determine that a turn parameter of the marine vessel exceeds a turn threshold and that a speed parameter of the marine vessel exceeds a speed threshold; and
  - operate the gyroscopic stabilizer system to achieve a target bank angle for the marine vessel.

2. The system of claim 1, wherein the target bank angle is based at least in part on the turn parameter and the speed parameter of the marine vessel.

3. The system of claim 2, wherein the turn parameter is a turn rate.

4. The system of claim 1, wherein the turn parameter is a turn rate or a change in heading, and wherein the speed parameter is a vessel speed over ground, a vessel speed over water, an engine speed, a motor speed, or a throttle position.

5. The system of claim 1, wherein operating the gyroscopic stabilizer system to achieve the target bank angle comprises locking a precession angle of the gyroscopic stabilizer system responsive to a determination that a measured bank angle of the marine vessel is less than or equal to the target bank angle.

6. The system of claim 5, wherein locking the precession angle comprises controlling the gyroscopic stabilizer to maintain the precession angle within a predetermined lockout angle range.

7. The system of claim 6, wherein the predetermined lockout angle range comprises precession of the gyroscopic stabilizer system to a maximum of 10 degrees from a vertical axis of the marine vessel.

8. The system of claim 1, wherein operating the gyroscopic stabilizer to achieve the target bank angle comprises commanding the gyroscopic stabilizer system to generate the stabilization torque to oppose a roll direction of the marine vessel responsive to a determination that a measured bank angle of the marine vessel is greater than the target bank angle.

9. The system of claim 1, wherein the turn parameter of the marine vessel is received from a user steering input at a manually operable steering device or an autopilot command.

10. The system of claim 1, wherein the one or more controllers are further configured to stop operating the gyroscopic stabilizer system to achieve the target bank angle responsive to a determination that a turn is completed based on the turn parameter or a measured bank angle of the marine vessel.

11. A method for controlling a gyroscopic stabilizer system configured to generate a stabilization torque for a marine vessel, comprising:
- determining that a turn parameter of the marine vessel exceeds a turn threshold and that a speed parameter of the marine vessel exceeds a speed threshold; and
- operating the gyroscopic stabilizer system to achieve a target bank angle for the marine vessel, wherein the target bank angle is based at least in part on the turn parameter and the speed parameter of the marine vessel.

12. The method of claim 11, wherein the turn parameter is a turn rate.

13. The method of claim 11, wherein the turn parameter is a turn rate or a change in heading, and wherein the speed parameter is a vessel speed over ground, a vessel speed over water, an engine speed, a motor speed, or a throttle position.

14. The method of claim 11, wherein operating the gyroscopic stabilizer system to achieve the target bank angle comprises locking a precession angle of the gyroscopic stabilizer system responsive to a determination that a measured bank angle of the marine vessel is less than or equal to the target bank angle.

15. The method of claim 14, wherein locking the precession angle comprises controlling the gyroscopic stabilizer to maintain the precession angle within a predetermined lockout angle range.

16. The method of claim 15, wherein the predetermined lockout angle range comprises precession of the gyroscopic stabilizer system to a maximum of 10 degrees from a vertical axis of the marine vessel.

17. The method of claim 11, wherein operating the gyroscopic stabilizer to achieve the target bank angle comprises commanding the gyroscopic stabilizer system to generate the stabilization torque to oppose a roll direction of the marine vessel responsive to a determination that that a measured bank angle of the marine vessel is greater than the target bank angle.

18. The method of claim 11, wherein the turn parameter of the marine vessel is received from a user steering input at a manually operable steering device or an autopilot command.

19. The method of claim 11, wherein the method further comprises stopping operation of the gyroscopic stabilizer system to achieve the target bank angle responsive to a determination that a turn is completed based on the turn parameter or a measured bank angle of the marine vessel.

* * * * *